United States Patent
Hartl et al.

(10) Patent No.: US 6,857,708 B2
(45) Date of Patent: Feb. 22, 2005

(54) WHEEL COVER FOR A VEHICLE WHEEL

(75) Inventors: Robert Hartl, Moosburg (DE); Ulrich Lindner, Sindelfingen (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 10/276,094

(22) PCT Filed: Dec. 21, 2001

(86) PCT No.: PCT/EP01/15244

§ 371 (c)(1),
(2), (4) Date: Nov. 13, 2002

(87) PCT Pub. No.: WO02/055321

PCT Pub. Date: Jul. 18, 2002

(65) Prior Publication Data

US 2004/0075335 A1 Apr. 22, 2004

(30) Foreign Application Priority Data

Jan. 11, 2001 (DE) .......................... 101 00 899

(51) Int. Cl.⁷ ................................ B60B 7/06
(52) U.S. Cl. .................. 301/37.102; 301/37.31; 301/108.1
(58) Field of Search .................. 301/37.101, 37.102, 301/37.21, 37.34, 37.31, 37.32, 37.33, 37.35, 37.36, 37.106, 108.1, 108.5

(56) References Cited

U.S. PATENT DOCUMENTS

| | | | | |
|---|---|---|---|---|
| 2,729,510 A | * | 1/1956 | Lyon ................... | 301/37.21 |
| 2,847,096 A | * | 8/1958 | Lyon ................... | 188/264 W |
| 2,911,260 A | * | 11/1959 | Lyon ................... | 301/37.21 |
| 4,544,209 A | * | 10/1985 | Braungart ............ | 301/37.21 |
| 5,205,615 A | | 4/1993 | Narita et al. ......... | 301/37.35 |
| 5,639,146 A | | 6/1997 | Chiu ................... | 301/37.34 |

FOREIGN PATENT DOCUMENTS

| | | |
|---|---|---|
| DE | 27 45 072 | 10/1977 |
| DE | 37 43 301 A1 | 12/1987 |
| DE | 91 07 266.2 | 6/1991 |
| EP | 0 310 777 A1 | 8/1988 |
| JP | 2231201 | 9/1990 |

OTHER PUBLICATIONS 63d, 4. 1715179, Gebr. Happich GmbH, Wupportal Elberfeld, Befestigungvorrichtung fuor Radziershcben, Oct. 26, 1955, H, 19959; Internationale Automobil Ausstellung, Frankfurt/M, Sep. 22, 1955 (T.7.Z.1) Drawing figures 1 and 2 only.*

* cited by examiner

Primary Examiner—Russell D. Stormer
(74) Attorney, Agent, or Firm—Crowell & Moring, LLP

(57) ABSTRACT

A wheel cover for a vehicle wheel has a holding device which is activated by a lateral pressing-on of the appropriately position wheel cover, to fix the wheel cover on the wheel body. The holding device is deactivated by another pressing-on of the wheel cover in the same direction, so that the wheel cover can then easily be removed from the wheel body. For this purpose, the holding device includes a connecting link path as well as a detent pin guided therein during the mounting of the wheel cover. During mounting of the wheel cover on the wheel body, the free end of the detent pin is guided in the connecting link path such that, a first pressing-on of the wheel cover causes it to arrive in a detent position in the connecting link path, while a second pressing-on changes it out of the detent position, into a connecting link path section by way of which the detent pin can be guided out of the connecting link path. The wheel cover can preferably be pressed onto the wheel body against a spring force. While the detent pin is fastened on the wheel cover, this fastening and/or the detent pin itself being at least slightly flexible, the connecting link path is provided in a wheel hub insert which can be inserted in the wheel body.

13 Claims, 5 Drawing Sheets

WHEEL COVER FOR A VEHICLE WHEEL

BACKGROUND AND SUMMARY OF THE INVENTION

This application claims the priority of German patent document 101 00 899.6 filed 11 Jan. 2001 (PCT International Application PCT/EP01/15244), the disclosure of which is expressly incorporated by reference herein.

The invention relates to a wheel cover for a vehicle wheel having a holding device that is activated by laterally pressing the appropriately positioned wheel cover onto the wheel, and thereby fixes the wheel cover on the wheel body. European Patent Document-EP-0 310 777 A1 and German Patent Document DE-OS 27 45 072 disclose assemblies of the generic type.

Various configurations are known for vehicle wheel covers, particularly for passenger cars. Such wheel covers must be relatively easy to fasten on the wheels, and removable just as easily when a wheel change is to take place. However, during a conventional driving operation, the wheel cover must be held securely and in a captive manner on the vehicle wheel.

The most common type of fastening is a snap-type connection which usually has several holding tongues with holding noses that reach behind a detent shoulder or the like. Normally, the holding tongues are situated on the wheel cover while the detent shoulder or the like is provided on the vehicle wheel or the so-called wheel body.

While these known wheel covers can be fitted relatively easily on the wheel body, specifically by a more or less strong lateral pressing-on, removal is virtually impossible except by using a suitable tool. As a result, wheel covers are often levered off the wheel body using a screwdriver, so that both the wheel body and the wheel cover may be damaged.

One object of the present invention is to provide a wheel cover which has a holding device that is easy mountable and removable (demountable). In particular, the wheel cover should be removable without a tool.

This and other objects and advantages are achieved by the wheel cover according to the invention, in which the holding device is deactivated by a second pressing-on in the same direction (with respect to the mounting direction) of the wheel cover, so that the wheel cover can easily be removed from the wheel body.

According to the invention, the same action or movement which is carried out for mounting the wheel cover (which—as known and explained—can be carried out without a tool) can also be implemented for the demounting or removal in that the wheel cover is again pressed against the wheel body.

This will then operate similarly to a ball point pen, where, as a result of a pressing of the operating button in the same direction, the refill can be moved out of the pen and can be moved back into it. Similarly, according to the invention, a wheel cover of a vehicle wheel can not only be mounted in a simple manner, but can also be removed just as easily.

In a preferred embodiment, the holding device consists of a connecting link path as well as of a detent pin guided therein (during the mounting of the cover plate). One of these elements is assigned to the wheel body and the other being assigned to the wheel cover. When the wheel cover is placed on the wheel body, the free end of the detent pin is guided in the connecting link path such that, when the wheel cover is pressed on a first time, its reaches a detent position in the connecting link path, the wheel cover is first held firmly on the wheel body. When, during another pressing-on of the wheel cover, the free end of the detent pin is changed from this detent position into a connecting link path section, by way of which the detent pin is moved out of the connecting link path; the wheel cover can then simply be lifted off the wheel body. This pressing-on of the wheel cover may take place with or without the aid of additional auxiliary devices.

If the mounted wheel cover can be pressed against the wheel body only after overcoming a spring force, it is ensured that, without the application of such a force, the detent pin remains in the detent position with its free end, so that, during normal driving of the vehicle the wheel cover cannot detach itself independently and then be lost. Furthermore, the force necessary to overcome the spring force may have the effect that, when the wheel cover is pressed on again, the detent pin with its free end will really move from the detent position of the connecting link path into the desired connecting link section leading out of the connecting link path. Finally, the latter movement is also promoted by the spring force which had to be overcome previously.

In this context, it should be pointed out that an independent spring element may be used to provide this spring force; such a spring can-be arranged at an appropriate location between the wheel cover and the wheel body and may be constructed, for example, as a coil pressure spring. In an advantageous combination of functions, however, the wheel cover itself may be constructed to be elastic—for example, in the form of a membrane—, and thereby act as a quasi cup spring. In this case, the wheel cover can be supported at least in sections of its circumference on the wheel body while the holding device is provided, for example, in the center of the wheel cover or at other circumferential sections, with such an arrangement it is necessary that, in the last-mentioned area (or possibly in several areas), a desired relative movement be possible between the wheel cover and the wheel body.

If the detent pin is fastened to the wheel cover, the above-mentioned connecting link path is assigned to the vehicle wheel or wheel body. In order to be able to use essentially conventional wheel bodies, the connecting link path can be provided in a separate component (in particular, a special so-called wheel hub insert), which can be inserted into the wheel body. In this case, it is structurally simpler to place a connecting link path in such a component than to mount the so-called detent pin there. The latter can be mounted in a simpler manner (and also protected, for example, by means of a so-called ring segment extension) on the interior side of the wheel cover facing the wheel body. In addition, it is advantageous for the fastening of the detent pin on the wheel cover and/or the detent pin itself to be at least slightly flexible, so that the detent pin with its free end can optimally follow the connecting link path which (with a view to the desired function) necessarily extends in a curved manner.

It is of course necessary to fasten the above-mentioned additional separate component, specifically the wheel hub insert, in an appropriate manner on the vehicle wheel or on its so-called wheel body. This can be done in a particularly simple manner when the wheel hub insert is held in the wheel body by means of at least slightly flexible holding noses, so that, if necessary, a simple exchange of the wheel hub insert will then be possible, if this should be required. To secure such a connection between the wheel hub insert and the wheel cover, the latter may have a so-called ring segment extension on its side facing the wheel body. In the assembled condition, this ring segment extension prevents a movement of the holding noses releasing the wheel hub insert with respect to the wheel body. In this case, such a ring segment extension can also assume a second function, specifically guiding or centering the wheel cover with respect to the wheel body or the wheel hub insert during the assembly.

A single holding device according to the invention (consisting of a detent pin and a connecting link path) may be sufficient. For more secure fastening as well as secure mounting (also under aspects of symmetry), two preferably diametrically opposite detent pins may be provided together with connecting link paths which are assigned to them.

When the most unfavorable circumstances coincide, a wheel cover according to the invention can be removed relatively easily by an unauthorized person (or even by a lateral stone throw from the wheel body) if, as indicated above, for removal purposes, the wheel cover need only be pressed against the wheel body and displaced by a certain distance with respect to the wheel body. In order to prevent such an event, according to an advantageous embodiment of the invention, the wheel cover can be provided with a securing element which can be overcome only in the case of a precise contact pressure and which, when the wheel cover is not precisely pressed on, will prevent displacement of the wheel cover to such an extent that it can easily be removed from the wheel body.

For the latter purpose, a so-called "blocking device" or the like may therefore be provided, which prevents an unauthorized or unintended removal of the wheel cover. On the one hand, this "blocking device" in the form of a suitable securing device according to the invention should be bridgeable relatively easily and particularly without a special tool. These requirements can be met relatively easily by requiring that the pressing-on of the wheel cover takes place in a very special manner in order to be successful; that is, in order to be able to easily remove the wheel cover after the pressing-on with a slight displacement from the wheel body. The latter requires the release of a holding device between the wheel cover and the wheel body by displacement of the wheel cover. Such release should take place only if, during the pressing onto the wheel body, the wheel cover was displaced by a certain minimal distance with respect to the wheel body. If the securing element according to the invention prevents the wheel cover from being displaced by the specified minimum distance relative to the wheel body in the event of a faulty (that is, not precise) pressing-on of the wheel cover, wheel cover also cannot be removed from the wheel body, because the above-mentioned holding device will not be released.

The securing element according to the invention may incorporate various operating principles. Preferably, two components, of which one is fastened to the wheel cover and the other is finally fastened to the wheel body, can then always hook into one another when the wheel cover is not pressed in a precise manner against the wheel body. Such interlocking (which is to be understood in the broadest sense) can take place in a form-locking and/or frictionally engaged manner. Frictional engagement can be utilized in a simple fashion by constructing the securing element as a pair of fitting elements; in that case a first fitting element (which, for visual as well as functional reasons, is provided on the side of the wheel cover facing the wheel body and is aligned essentially perpendicularly with respect to that side) can be introduced with a tight fit into a second fitting element finally fastened in or on the wheel body.

Such precise pressing-on of the wheel cover, which permits a displacement of the wheel cover to such an extent that the holding device between the wheel cover and the wheel body is deactivated, may require, for example, that the wheel cover be pressed on precisely perpendicularly to the wheel plane or the wheel cover plane; that is, exactly in the direction of wheel axis. This can be achieved either by requiring that the (preferably circular) wheel cover (mounted, as customary, concentrically with respect to the wheel) be pressed exactly in its (circular) center by a corresponding contact pressure, or that such contact pressure, for pressing the wheel cover onto the wheel body, be applied at two diametrically opposite points in the edge area of the wheel cover. For example, it is particularly reliable if, when pairs of fitting elements are used as securing elements, two such pairs are provided which, viewed over the circumference of the circular wheel cover, are offset by 180° with respect to one another. In this case, these pairs of fitting elements may be designed such that only if the contact pressure for pressing the wheel cover against the wheel body is applied in their area, these fitting elements permit the displacement or displacing movement of the wheel cover required for deactivating the holding device.

In a preferred simple but reliable design of the fitting elements which mutually interact as a securing element according to the invention, one of the fitting elements is constructed in the form of a pin with a rectangular cross-section and the other fitting element is a structure that guides the pin, at least between two mutually opposite sides. Pictorially, this pair of fitting elements can be constructed for this purpose, for example, in the manner of a match box, in which case the interior box part receiving the matches with a rectangular cross-section is connected as a "pin" to the wheel cover and, when the wheel cover is pressed against the wheel body, is inserted into the exterior box shell part, which guides this "pin" as the above-mentioned "structure" and is finally fastened to the wheel body. In this case, it should be noted that neither this structure of the securing element according to the invention, which is finally fastened to the wheel body, nor the second fitting element, which is finally fastened to the wheel body, need not be fastened directly to the wheel body. On the contrary, this second fitting element (or the above-mentioned structure guiding the pin) may be provided on an intermediate element between the wheel cover and the wheel body. The intermediate element, may for example, carry the wheel cover and the pertaining holding device directly, and in turn is appropriately fastened to the wheel body (indicated above in the form of the so-called wheel hub insert illustrated there).

In order not to let the demand on the manufacturing tolerances at the above-mentioned pair of fitting elements grow to extreme proportions, this pair of fitting elements may be designed such that, after a partial displacement of the wheel cover, a more narrow fit will be present. This ensures that in fact only when the wheel cover is pressed completely precisely into the direction of the wheel axis against the wheel body, a free moving position is ensured between these fitting elements. Even when a low diagonal force is introduced, these fitting elements will then hook into one another at this narrowed fit and thereby prevent a further displacement of the wheel cover in a direction releasing the holding device between the wheel cover and the wheel body.

Other objects, advantages and novel features of the present invention will become apparent from the following detailed description of the invention when considered in conjunction with the accompanying drawings.

DETAILED DESCRIPTION OF THE DRAWINGS

Figure 1:
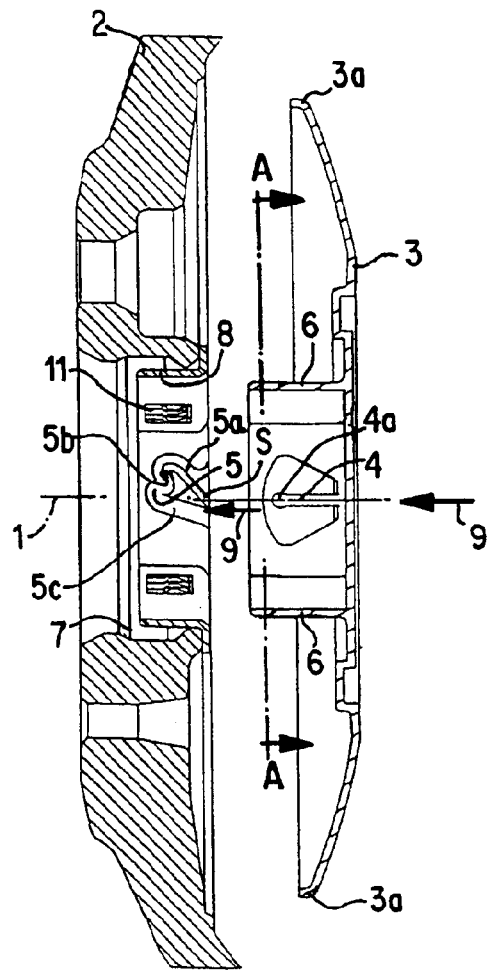
FIG. 1 is a partial longitudinal sectional view of a vehicle wheel in which a wheel hub insert according to the invention is situated, onto which or in which the wheel cover is to be mounted.
Figure 2:
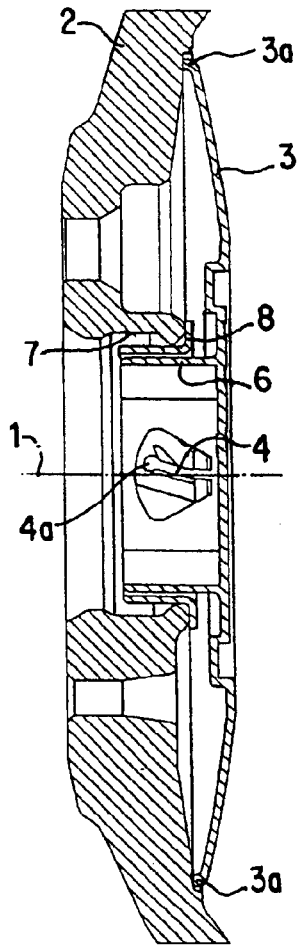
FIG. 2 illustrates the wheel cover mounted corresponding to the representation of FIG. 1.

First, with reference to FIGS. 1, 2, reference number 1 indicates the axis of rotation of a partially shown wheel body 2 of a vehicle wheel, particularly of a wheel of a passenger car. A wheel cover 3 is to be mounted laterally on the wheel body 2, in a simple manner, such that it can be removed just as easily (particularly without the aid of a tool). For this purpose, two diametrically opposite holding devices are provided consisting of a detent pin 4 as well as of a connecting link path 5.

Figure 6:
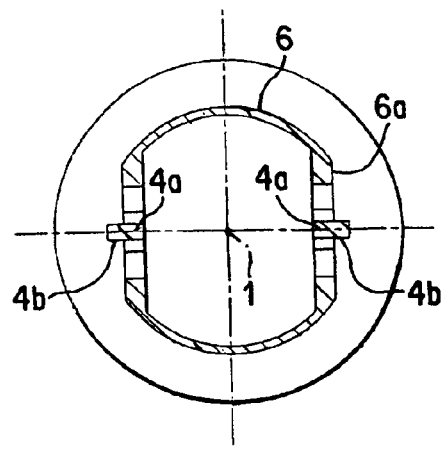
FIG. 6 is a detailed sectional view A—A of FIG. 1.

On the interior side of the wheel cover 3 facing the wheel body 2, two ring segment extensions 6 are provided concentrically to the axis of rotation 1 and arranged diametrically opposite each other. The diameter of a circular ring formed by these corresponding ring segment extensions 6 is adapted approximately to a wheel hub opening 7 in the wheel body 2. Between the two diametrically opposite ring segment extensions 6, two detent pins 4 are fastened to the interior side of the wheel cover 3 which extend approximately in the direction of the axis of rotation 1. For fastening purposes, these detent pins are relatively flexible; that is, each detent pin 4 is linked quasi elastically to the wheel cover 3. The free ends 4a of the detent pin 4 are provided with two aligned holding pins 4b arranged perpendicular to the axis 1 of rotation and pointing radially outward as illustrated in FIG. 6.

An additional component of each holding device is a connecting link path 5. Two such connecting link paths 5 are provided, corresponding to the detent pins 4, essentially diametrically opposite each other, on or in the interior surface of an essentially ring-shaped wheel hub insert 8 which is circular-cylindrical on the exterior side. The shape of the wheel hub insert 8 is best shown in FIG. 4. The connecting link paths 5 are shaped out of a thicker wall section 8a of the wheel hub insert 8 and have a guiding-in section 5a, a so-called detent position 5b, as well as a guiding-out section 5c. (See FIG. 3.) The guiding-in section 5a, beginning in a start position S (in FIG. 1 at the level of the axis of rotation 1), and the guiding-out section 5c are sloped in a ramp-shaped manner with respect to the axis of rotation 1, in the representation according to FIG. 1, section 5a being situated above and section 5c being situated below the axis of rotation 1. The detent position 5b is situation in-between, which in this figure is situated slightly above the axis 1 of rotation. The detent position represents a reversal point in the connecting link path 5. In this case, the connecting link path 5 or its sections 5a, 5b, 5c, which are consecutive in this sequence, are bounded on the exterior side completely or partially by the thicker wall section 8a and, on the interior side, by a so-called guide piece 8b which, however, actually is also a component of the thicker wall section 8a.

As best shown in FIG. 1, the wheel hub insert 8 is inserted into the above-mentioned wheel hub opening 7, which has a circular cross-section. For mounting the wheel cover 3 onto the wheel body 2, the wheel cover is fitted in the direction of the arrow 9 from the side onto the wheel body 2 in such a manner that each detent pin 4 is introduced by means of its holding pin 4b situated at the free end 4a, into the assigned connecting link path 5 or into its guide-in section 5a. In this case, the wheel cover 3 is centered or appropriately guided by the two above-mentioned ring segment extensions 6 and their so-called flattenings 6a (FIG. 6) which slide with their exterior surfaces along the assigned interior surface of the wheel hub insert 8. By means of this slide-in movement according to the direction of the arrow 9, the wheel cover 3 finally arrives in the position illustrated in FIG. 2, which reflects the mounted condition. In this case, each holding pin 4b of each detent pin 4 in the assigned connecting link path 5 is in the above-mentioned detent position 5b. This position can be taken up only after the wheel cover 3, which previously came to rest on the wheel body 2 with its outer circumference 3a, in the area of the detent pins 4 is pressed farther corresponding to the direction of the arrow 9. The wheel cover itself 3 therefore acts as a diaphragm spring or cup spring which, in the mounted condition according to FIG. 2 (that is, when the holding pin 4b at the free end 4a of each then braced detent pin 4 is in the detent position 5b) is virtually prestressed.

Figure 3:
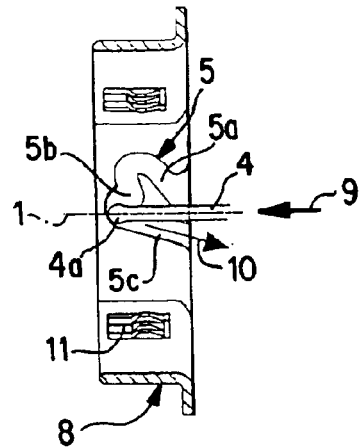
FIG. 3, is a sectional view of the wheel hub insert including the collecting link path, the detent pin guided in the connecting link path, during a demounting of the wheel cover.
Figure 4:
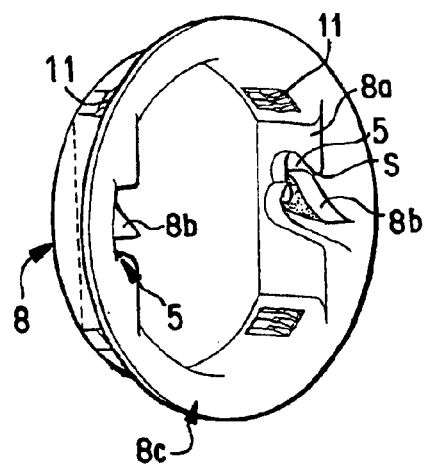
FIG. 4 is a perspective view of the wheel hub insert.

The conditions during a demounting of the wheel cover 3 are best illustrated in FIG. 3. For this purpose, the wheel cover 3 (not shown, other than its detent pins 4) is again pressed in the direction of the arrow 9 against the wheel body 2 or against the wheel hub insert 8 situated therein (specifically in the proximity of the two detent pints 4). The resulting displacement of the detent pins 4 in the direction of the arrow 9 (permitted by the above-explained elastic characteristic of the quasi prestressed wheel cover 3), causes each free end 4a of the detent pin 4 (which is stressed as a result of its deflection from the so-called zero position corresponding to FIG. 1) to move from the detent position 5b of the connecting link path 5, into the guide-out section 5c of the connecting link path 5. Thereafter, due to the described spring effect, and also manually, the wheel cover 3 can be removed against the direction of the arrow 9 from the wheel body 2 (that is, from the wheel hub insert 8). In this case, the holding pin 4b at the free end 4a of the detent pin 4 moves in the guide-out section 5c of the connecting link path 5 according to arrow 10.

Figure 5:
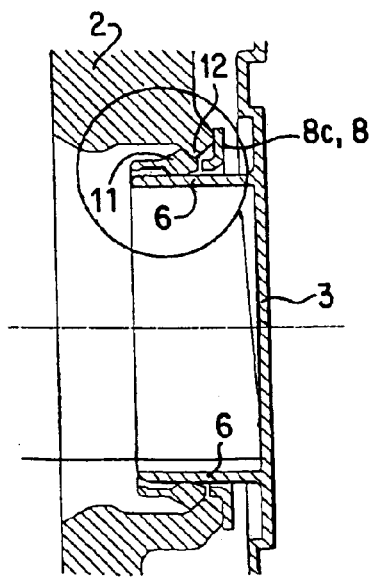
FIG. 5 is a partial longitudinal sectional view, rotated with respect to FIG. 1 about the wheel axis of the wheel body, that shows the fastening of the latter to the wheel body.

FIG. 5 illustrates best how the wheel hub insert 8 is held in the wheel body 2 or in its wheel hub opening 7. Holding noses 11 are shaped out of the wall of the wheel hub insert 8 at a total of four points and situated diametrically opposite one another in pairs (compare also FIGS. 1 and 4), which holding noses 11 project elastically beyond the cylindrical exterior surface of the wheel hub insert 8. As illustrated in FIG. 5, these elastic holding noses 11, in the mounted condition, reach behind a corresponding ring-shaped projection 12 of the wheel body 2 in the wheel hub breakthrough 7. Interacting with a marginal web 8c of the wheel hub insert 8, the latter can therefore (at least in the direction of the axis 1 of rotation) not move with respect to the wheel body 2 as long as the elastic holding noses 11 cannot be deflected in the radial direction to the inside toward the axis of rotation 1. As illustrated, this is prevented by the two ring segment extensions 6 of the wheel cover 3 which, when the wheel cover 3 is mounted, are situated in the area of the holding noses 11 inside the latter. If, in contrast, the wheel cover 3 is not mounted, the wheel hub insert 8 can also be demounted against the direction of the arrow 9 because, when a corresponding tension force is applied, the holding noses 11 move slightly radially toward the inside. Inversely, a mounting of the wheel hub insert 8 is of course also possible. In addition, if desired or required, a certain orientation can be defined or provided in the circumferential direction between the wheel cover 3 and the wheel hub insert 8.

Figure 9:
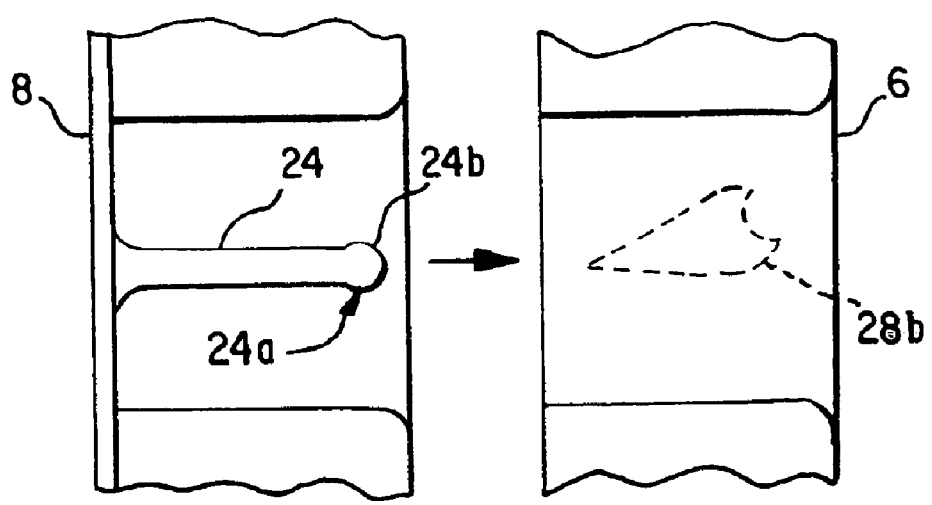
FIG. 9 is a schematic depiction of another embodiment of the invention.

By means of the illustrated holding device described above (essentially consisting of the two detent pins 4 and the assigned connecting link paths 5), not only can the wheel cover 3 according to the invention be easily mounted but, in particular, it can also be removed just as easily. For the two above-mentioned operations, only a contact pressure force in the direction of the arrow 9 need be applied to the wheel cover 3, for example, in the area of the detent pins 4. As noted previously, as between the connecting link paths 5 and detent pins 4, one of these elements is assigned to the wheel body, and the other to the wheel cover. FIG. 9 shows an embodiment in which the detent pin 24 is assigned to the hub insert 8 for the wheel body, and the guide piece 286 is assigned to the ring segment extension 6 of the wheel cover.

FIGS. 7 and 8a to 8c show an advantageous further embodiment of the invention that includes a so-called blocking device in the form of two securing elements formed by so-called fitting elements. These ensure that the wheel cover can be displaced only by a precise pressing-on such that subsequently it can easily be removed from the wheel body. First, with reference to FIG. 7, analogous to the preceding figures, the reference number 1 indicates the axis of rotation of a vehicle wheel (not shown). A wheel cover 3 can in this case be placed on its so-called wheel body. Essentially only the rearward or interior side (facing the wheel body) (not shown) of the wheel cover 3 is visible here. The axis 1 of rotation extends through the center of the wheel cover 3 and extends perpendicularly to a plane described by the wheel cover 3.

As explained above, from this interior side of the wheel cover 3, two detent pins 4 extend essentially parallel to the axis 1 of rotation toward the interior, that is, toward the wheel body. At the free end of each detent pin 4, and perpendicular thereto, a holding pin 4b is provided, which interacts with a connecting link path that is provided in a so-called wheel hub insert (not shown in FIG. 7). The wheel hub insert is fastened to the wheel body and, together with the latter, forms a holding device for the wheel cover 3 on the wheel body. The above-mentioned connecting link path is designed such that the holding device is activated by the pressing of the wheel cover 3 onto the wheel body, so that the wheel cover is fixed on the wheel body. By a second pressing-on of the wheel cover in the same direction, while it is simultaneously displaced toward the wheel body, this holding device is deactivated, so that then the wheel cover 3 can easily be removed from the wheel body.

Figure 7:
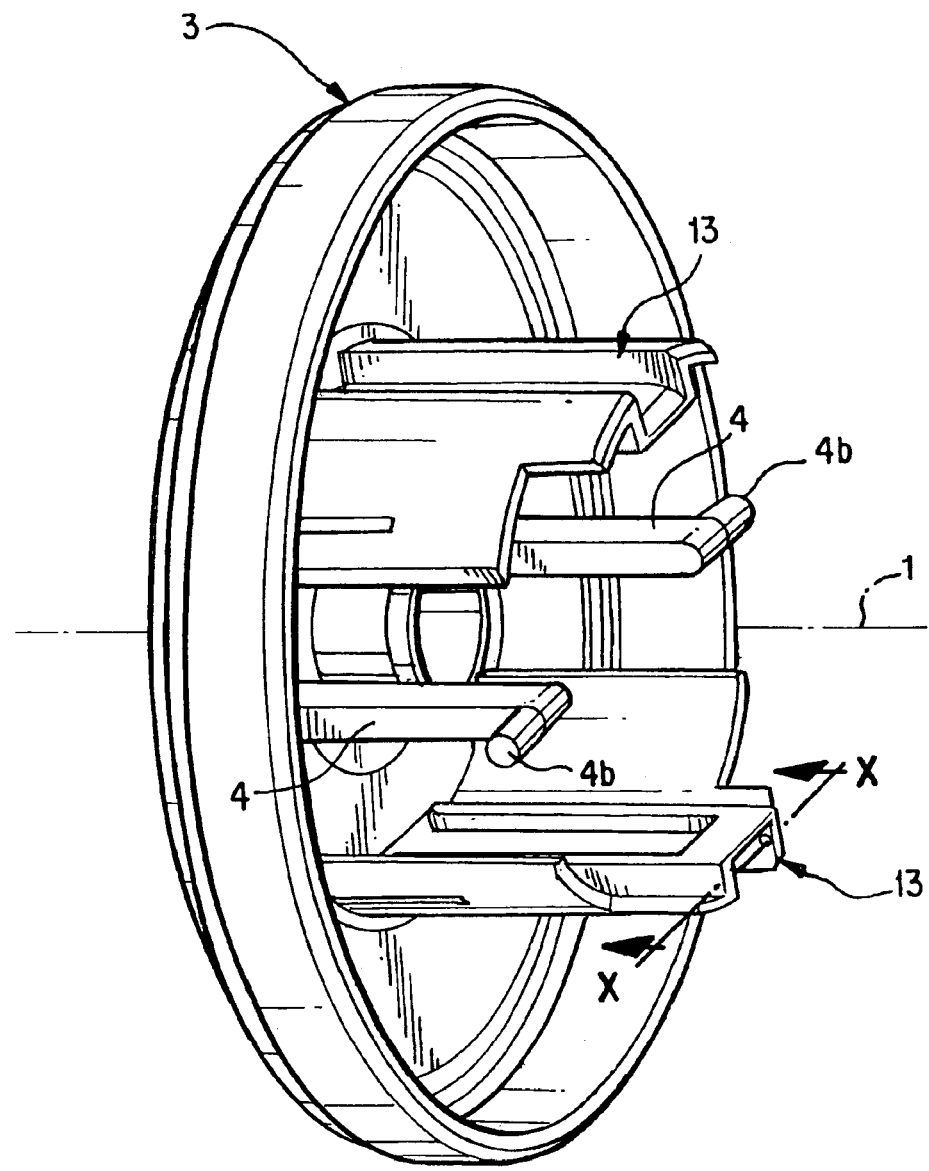
FIG. 7 is a perspective view of the securing devices or a "blockading device", from the rear or the inside.

As illustrated in FIG. 7, in addition to the two detent pins 4, two so-called first fitting elements 13 project from the interior side of the wheel cover 3 parallel to the axis 1 of rotation. These fitting elements 13 are arranged diametrically opposite each other, away from the wheel cover center; that is, viewed along the circumference of the circular wheel cover, they are mutually offset by 180°. Each of these fitting elements 13 forms a groove-shaped structure with a rectangular cross-section, extending precisely parallel to the axis 1 of rotation. A second fitting element 14, which is constructed virtually as a pin with a corresponding rectangular cross-section, projects into this groove of each fitting element 13. The second fitting element 14 is illustrated in FIGS. 8a to 8c, which show a section X—X of FIG. 7 through the fitting element 13 (there, without a second fitting element 14).

Figure 8A:
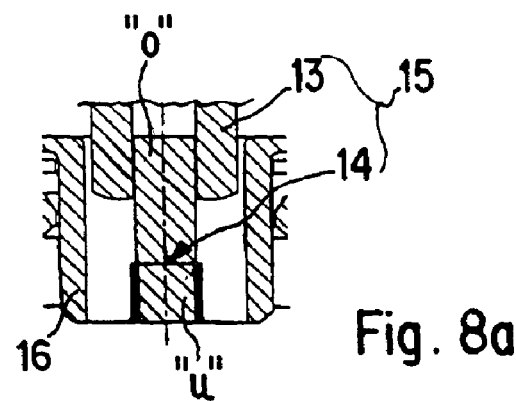
FIGS. 8a to 8c are sectional views of a pair of fitting elements which form a securing element used as a "blockading device", in three different positions of the wheel cover with respect to the wheel body or an intermediate element mounted thereon which carries the second fitting element of the pair of fitting elements.
Figure 8B:
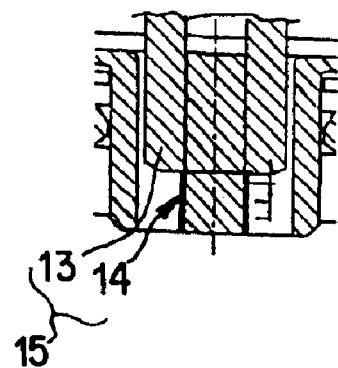
Figure 8C:
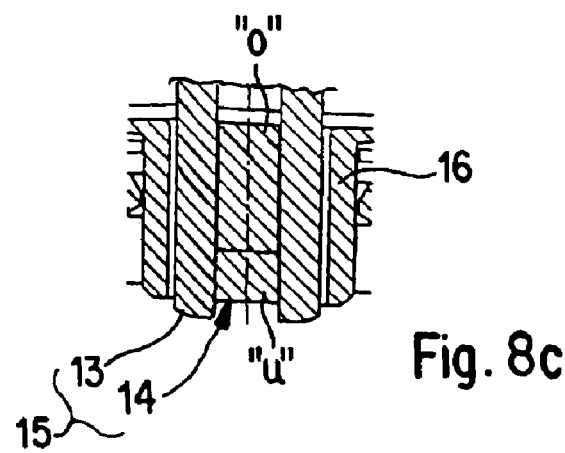

The second fitting element 14 illustrated in FIGS. 8a to 8c (shown in cross section) is finally fastened or provided on the wheel carrier, and here on the wheel hub insert mentioned in the second-to-the last paragraph. This pin-type second fitting element 14 is surrounded at a sufficient distance by a so-called edge structure 16 (which, however, is not required for the actual function of the two fitting elements 13, 14 mutually interacting as a so-called securing element 15).

FIGS. 8a to 8c successively show how the mutual relative position of the two fitting elements 13, 14 changes when the wheel cover 3 (and thereby the first fitting element 13 fastened thereto), is pressed against the wheel body and is therefore displaced toward this wheel body for deactivating the above-mentioned holding device. By means of this displacing movement or displacement of the fitting element 13, the second fitting element 14 constructed as a pin is introduced into the "groove" of the first fitting element 13. In this case, the "groove" or the structure forming the first fitting element 13 guides the "pin" in the form of the second fitting element 14, as illustrated, between two mutually opposite sides.

In this case, the fit between the two fitting elements 13, 14 is dimensioned to be so narrow that the displacement illustrated in FIGS. 8a to 8c will be possible only when the wheel cover 3 is pressed precisely in the direction of the axis of rotation 1. When now two such pairs of fitting elements 13, 14 are provided along the circumference of the wheel cover 3 mutually offset by 180° (as illustrated), the above-mentioned prerequisite of the exact pressing-on of the wheel cover 3 against the wheel body can be met only if the corresponding contact pressure is applied to the exterior side (not visible in FIG. 7) of the wheel cover 3 exactly in those areas behind which the fitting elements 13 project from the interior side of the wheel cover 13. In this case, the entire contact pressure must also be uniformly distributed to these two points. If, in contrast, this requirement has not been met (that is, the wheel cover 13 is pressed non-uniformly from the outside or above the incorrect points against the wheel body), the resultant "oblique" loading causes the two fitting elements 13, 14 of a pair of fitting elements to hook into one another (that is, rub against one another to such an extent that a self-locking occurs), and the wheel cover 13 cannot be displaced farther toward the wheel body or the fitting element 14 cannot be introduced farther into the fitting element 13. Summarizing, the fitting elements 13, 14 (or the corresponding pair of fitting elements) therefore form a securing element 15 which, when the wheel cover 3 is not pressed exactly against the wheel body, will prevent that this wheel cover 3 is displaced to such an extent that it can easily be removed from the wheel body.

As shown in FIGS. 8a to 8c, the fitting element 14 is designed such that, after a partial displacement of the wheel cover 3, a narrower fit will be present. The cross-section of the rectangular "pin" is slightly larger in its "lower" "U"

area than in the "O" area of its free end. While, in the "upper" "O" area, the first fitting element 13 always rests against the second fitting element 14 when the wheel cover 3 is mounted on the wheel body, in the "lower" "U" area, the first fitting element 13 will come in contact with the second fitting element 14 only when the wheel cover 3 and thus the first fitting element 13 has already been displaced, that is, pressed on, by a certain distance with respect to the wheel body. The increased displacement or pressing-on of the wheel cover 3 (and thus of the fitting element 13) required for release of the above-mentioned holding device between the wheel cover and the wheel body will be possible only if the wheel cover 3, as described above, is pressed precisely in the direction of the wheel axis 1 against the wheel body, because only then will a free movement be ensured between the fitting elements 13, 14.

The securing element 15 formed by the fitting elements 13, 14 or here the two securing elements 15 ensure that, only in the case of an exact pressing-on of the wheel cover 3 will a release of the above-mentioned holding device be possible, while, even in the case of a slightly oblique introduction of force, the fitting elements 13, 14 hook into one another and thus prevent a further displacement of the wheel cover 3 in a direction releasing the holding device between the wheel cover and the wheel body. In this case, the introduced securing device 15 is distinguished by a simple, weight-saving cost-effective construction while simultaneously reliably carrying out its function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wheel cover apparatus for a vehicle wheel, said apparatus comprising a holding means for releasably fixing the wheel cover on a wheel body of said wheel, said holding means having an engaged state in which said wheel cover is fixed on the wheel body, and a disengaged state in which the wheel cover is released from being fixed on said wheel body, wherein:
    said holding means is actuatable into said engaged state by a first manipulation, which consists of a lateral pressing of the wheel cover in a direction toward the vehicle wheel;
    said holding means is actuatable into said disengaged state by a second manipulation, which consists of a pressing of the wheel cover in the direction toward the vehicle wheel; and
    said second manipulation is substantially identical to said first manipulation.

2. The wheel cover apparatus according to claim 1, wherein the wheel cover can be pressed against spring force onto the wheel body.

3. The wheel cover apparatus according to claim 1, further comprising a securing element which exerts a force that can be overcome only by means of a precise pressing-on and which, when the pressing-on of the wheel cover is not exact, prevents the wheel cover from being displaced to such an extent that it can easily be removed from the wheel body.

4. The wheel cover apparatus according to claim 3, wherein:
    the securing element comprises a pair of fitting elements;
    a first one of said fitting element provided on a side of the wheel cover facing the wheel body and aligned essentially perpendicularly thereto is insertable snugly into or onto a second one of said fitting elements that is fastened to the wheel body.

5. The wheel cover apparatus according to claim 4, wherein:
    one of the fitting elements is constructed in the shape of a pin with a rectangular cross-section; and
    the other fitting element is constructed as a structure guiding the pin at least between two mutually opposite sides.

6. The wheel cover apparatus according to claim 5, wherein two pairs of fitting elements are provided about the circumference of the essentially circular wheel cover, offset by 180° with respect to one another.

7. The wheel cover apparatus according to claim 6, wherein at least one of the fitting elements of a pair of fitting elements is configured such that a fit between said pin and said structure guiding said pin has a decreased tolerance after a partial displacement of the wheel cover by a pressing on thereof.

8. Wheel cover apparatus for a vehicle wheel, having a holding device which is engaged by a first lateral pressing of the wheel cover in a direction toward the vehicle wheel, to fix the wheel cover on a wheel body of the wheel, and is disengaged by a second pressing of the wheel cover substantially identical to the first pressing, whereby that the wheel cover can easily be removed from the wheel body; wherein:
    the holding device comprises:
        a connecting link path arranged on a first one of the wheel body and the wheel cover;
        a detent pin guided in the connecting link path during mounting of the wheel cover, said detent pin being arranged on a second one of the wheel body and the wheel cover;
    when the wheel cover is placed on the wheel body, a free end of the detent pin is guided in a first portion of the connecting link path so that, by means of said first lateral pressing of the wheel cover, said free end of the detent pin arrives in a detent position in the connecting link path, whereby said holding device is engaged; and
    by said second pressing of the wheel cover, the free end of the detent pin is changed out of the detent position into a second portion of the connecting link path, via which the detent pin can be moved out of the connecting link path, whereby said holding device is disengaged.

9. The wheel cover according to claim 8, wherein:
    the detent pin is mounted on the wheel cover; and
    one of the detent pin itself and a fastener by which the detent pin is fastened to the wheel cover is flexible.

10. The wheel cover apparatus according to claim 8, wherein the connecting link path is provided in a wheel hub insert which can be inserted into the wheel body.

11. The wheel cover apparatus according to claim 10, wherein:
    the wheel hub insert is held on the wheel body by elastically constructed holding noses in the wheel body;
    at least one ring segment extension of the wheel cover in its mounted state prevents movement of the holding noses releasing the wheel hub insert with respect to the wheel body.

12. The wheel cover apparatus according to claim 8, wherein two substantially diametrically opposite detent pins are provided which have connecting link paths assigned to them.

13. Apparatus for detachably mounting a wheel cover on a vehicle wheel body, comprising:

an elongated flexible member disposed in a resting orientation on a first one of said wheel cover and said wheel body; and a guide piece arranged on a second one of said wheel cover and said wheel body, in a position such that a first pressing of said wheel cover onto said wheel body causes a free end of said flexible member to be diverted by said guide piece along a first path from said resting orientation of said flexible member into a flexed deflected position wherein said flexible member engages with a detent configuration on said guide piece, which retains said wheel cover on said wheel body; wherein, said guide piece has a shape which defines a second path leading said free end of said flexible member out of said detent configuration to return said flexible member to said resting position; and a second pressing of said wheel cover causes flexure of said flexible member to move said flexible member out of said detent position along said second path, whereby said wheel cover is released from said wheel body.

* * * * *